(12) United States Patent
Scavone

(10) Patent No.: US 8,601,700 B2
(45) Date of Patent: Dec. 10, 2013

(54) SPRINKLER DROP RULER

(75) Inventor: Matthew Scavone, Hunlock Creek, PA (US)

(73) Assignee: SimplexGrinnell LP, Westminster, MA (US)

(*) Notice: Subject to any disclaimer, the term of this patent is extended or adjusted under 35 U.S.C. 154(b) by 193 days.

(21) Appl. No.: 13/325,724

(22) Filed: Dec. 14, 2011

(65) Prior Publication Data

US 2013/0152417 A1  Jun. 20, 2013

(51) Int. Cl.
*B43L 7/00* (2006.01)
*G01B 5/14* (2006.01)

(52) U.S. Cl.
USPC .............................................. 33/484; 33/483

(58) Field of Classification Search
USPC .................... 33/483, 484, 485, 489, 759, 760
See application file for complete search history.

(56) References Cited

U.S. PATENT DOCUMENTS

| | | | | |
|---|---|---|---|---|
| 1,003,626 A | * | 9/1911 | Malcolm | 33/760 |
| 2,342,234 A | * | 2/1944 | Abegg | 33/760 |
| 4,167,065 A | * | 9/1979 | Alaniz et al. | 33/759 |
| 5,820,183 A | * | 10/1998 | Marcus | 33/486 |
| 6,901,679 B2 | * | 6/2005 | Corbett et al. | 33/645 |
| 8,191,278 B2 | * | 6/2012 | Sander et al. | 33/768 |
| 2002/0152621 A1 | * | 10/2002 | Letourneau | 33/277 |

* cited by examiner

*Primary Examiner* — G. Bradley Bennett
(74) *Attorney, Agent, or Firm* — Brinks Hofer Gilson & Lione

(57) ABSTRACT

A sprinkler drop ruler is provided for measuring the sprinkler drop from a roughed-in outlet. The sprinkler drop ruler includes a rigid frame having an opening, a handle connected to the rigid frame and in fixed relation to the rigid frame, and a ruler with an end shaped to seat in the opening and configured to move inside or along a side of the handle in order to measure a sprinkler drop. The sprinklerfitter may thus use the sprinkler drop ruler in order to measure the sprinkler drop. In this way, the sprinklerfitter does not need to climb a ladder to measure the sprinkler drop.

15 Claims, 5 Drawing Sheets

SPRINKLER DROP RULER

BACKGROUND

A fire sprinkler system comprises a fire suppression agent supply system, one or more fire sprinklers, and a piping system connected between the supply system and the fire sprinklers. The fire sprinkler system can be installed in a variety of environments, such as factories, commercial buildings, homes, etc. One type of fire sprinkler system is a wet pipe system that comprises a water supply system, water piping, and one or more fire sprinklers.

In order to install a fire sprinkler system, the piping system needs to be connected to the supply system and to the fire sprinklers. Typically, the pipes are installed close to the ceiling with a roughed-in outlet. A roughed-in outlet is part of plumbing work for the fire sprinkler system that is ready for future connection to a fixture (such as a sprinkler). The sprinklerfitter will then measure the drop from the roughed-in outlet of the pipe to where the sprinkler will connect. For example, in a nine-foot ceiling, the pipes may be installed close to the top of the ceiling. At each point in the piping below which a sprinkler is to be installed, the piping includes a roughed-in outlet. In an installation where the sprinklers are supposed to be installed at the drop-ceiling, the sprinklerfitter measures from the roughed-in outlet to the drop ceiling. In particular, the sprinklerfitter must move the ladder under each roughed-in outlet, climb the ladder, and take the measurement from the roughed-in outlet to the drop ceiling. Doing each of these steps for an installation with dozens (or possible hundreds) of sprinkler heads takes a considerable time.

SUMMARY

The present embodiments relate to a sprinkler drop ruler. In one aspect, the sprinkler drop ruler is provided. The sprinkler drop ruler may comprise: a rigid frame having an opening; a handle connected to the rigid frame and in fixed relation to the rigid frame; and a ruler with an end shaped to seat in the opening and configured to move inside or along a side of the handle in order to measure a sprinkler drop. The ruler may be positioned at least partly within the handle so that the ruler is configured to move within the handle. Further, the handle may be connected to the rigid frame so that the opening of the rigid frame is co-axial with the handle. Moreover, the end of the ruler can be rectangular in shape and the opening of the rigid frame is also rectangular in shape and matched to seat the end of the ruler. The sprinkler drop ruler may further include a window connected to the handle with the window being at least partly transparent and include indicia so that the ruler is visible through the window.

In another aspect, a method for measuring a sprinkler drop is provided. The method includes using a sprinkler drop ruler that includes: a rigid frame having an opening; a handle connected to the rigid frame and in fixed relation to the rigid frame; and a ruler with an end shaped to seat in the opening and configured to move inside or along a side of the handle in order to measure a sprinkler drop. The method further includes the sprinklerfitter holding the handle in one hand, and the sprinklerfitter moving the ruler with another hand until the end of the ruler comes in contact with the roughed-in outlet. When the end of the ruler is contacting the roughed-in outlet, the sprinklerfitter may read the measurement of the ruler.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

Figure 1:
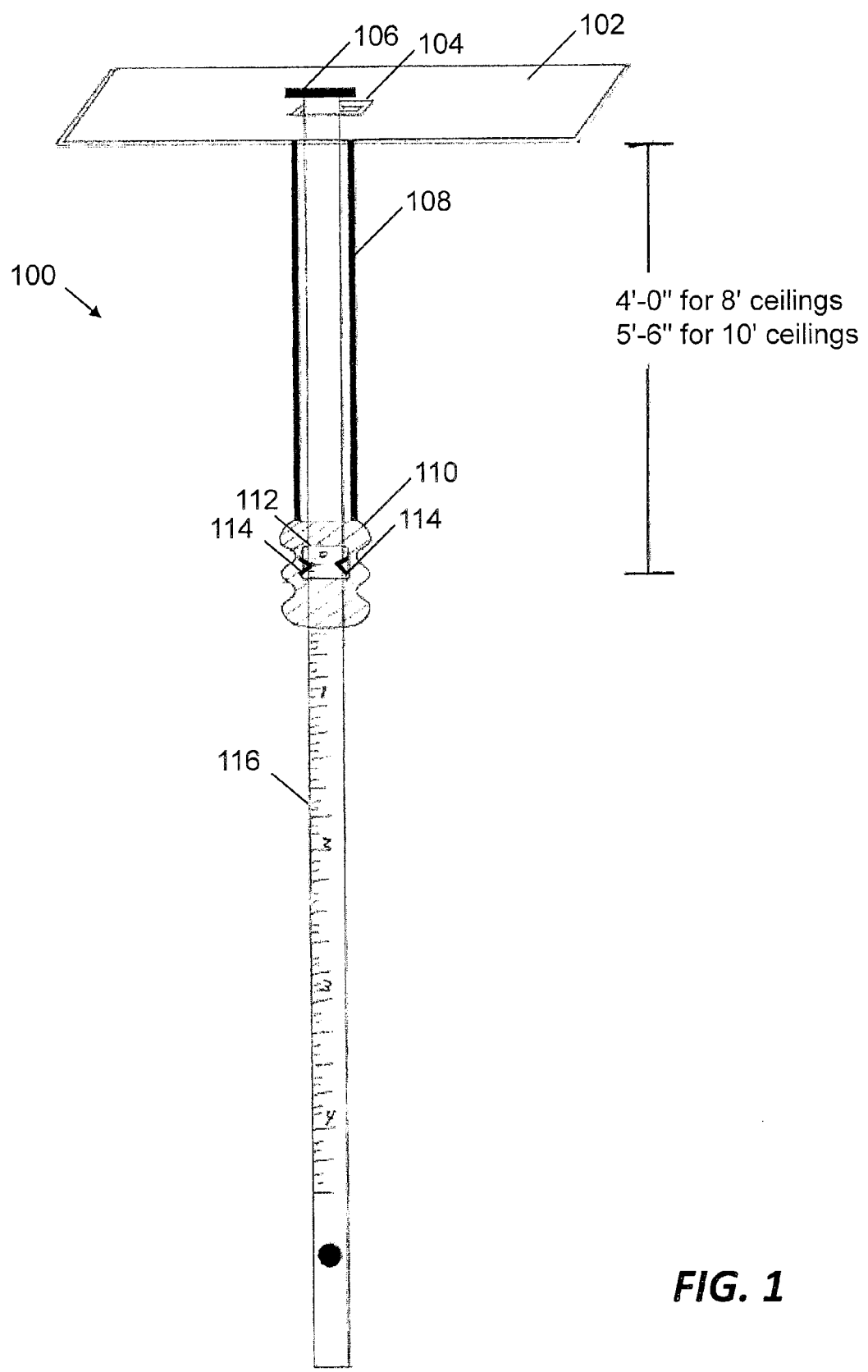
FIG. 1 is a perspective view of the sprinkler drop ruler.

A sprinkler drop ruler 100 embodying one example of the present invention is illustrated in FIG. 1. The sprinkler drop ruler 100 includes a rigid frame 102, a handle 108, and a ruler 116. The rigid frame 102 may be any type of rigid structure, such as metallic (e.g., aluminum), plastic (e.g., plexiglass), or the like. Further, the rigid frame 102 may be transparent (in order to see through the rigid frame 102), translucent or opaque. The rigid frame 102 is shown in FIG. 1 as rectangular in shape. The rigid frame 102 may be composed of other shapes, such as square or round. The rigid frame 102 further includes an opening 104 through which the ruler 116 may slide. The opening 104 is illustrated as rectangular in shape. As discussed in more detail below, the opening 104 may be other shapes, such as square or round.

Figure 7:
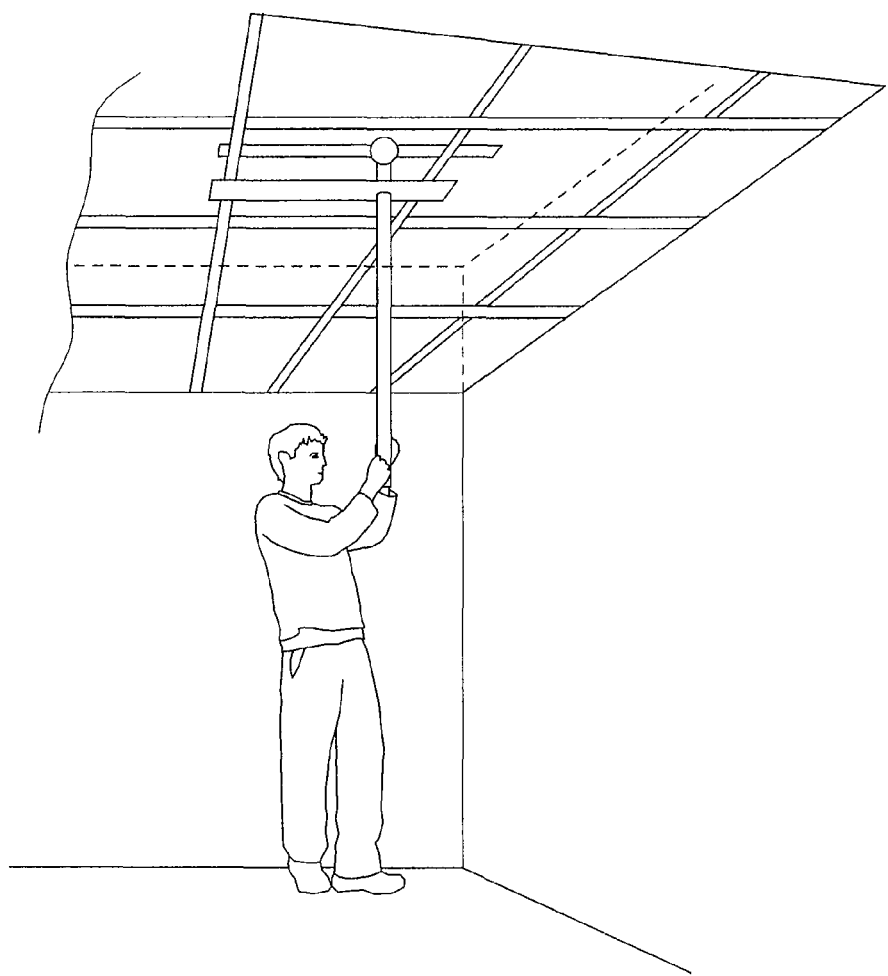
FIG. 7 is a perspective view of the sprinkler drop ruler in operation.

As discussed in the background, the sprinkler is positioned at the approximate height of the ceiling tile lattice structure (the structure that holds the ceiling tiles in place). The length of the sprinkler drop from the roughed-in outlet to the sprinkler is measured from the roughed-in outlet to the ceiling tile lattice structure. In order to obtain this measurement with the sprinkler drop ruler 100, the rigid frame 102 may be pushed against the ceiling tile lattice, and the ruler 116 is slid upward until it contacts the roughed-in outlet in order to measure the sprinkler drop. Thus, in one embodiment, the size of the rigid frame 102 is equal to or larger than an opening in the ceiling tile lattice. This is depicted in FIG. 7, discussed below. For example, the ceiling tile lattice may comprise 2'×2'. So that, in one embodiment, the rigid frame 102 in one dimension is equal to or greater than 2' (and in another dimension can be 2' or less, such as 1' or less). As another example, the ceiling tile lattice may comprise 1'×1'. So that, in one embodiment, the rigid frame 102 in one dimension is equal to or greater than 1'. In this way, when the operator presses the rigid frame 102 against the ceiling tile lattice, the rigid frame 102 is stopped by the ceiling tile lattice.

Figure 4:
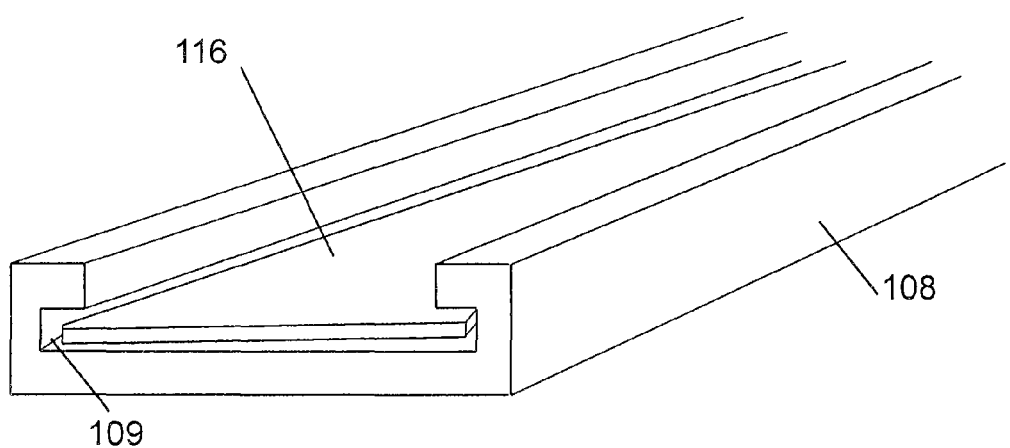
FIG. 4 is a perspective view of the handle and the ruler of the sprinkler drop ruler.

The sprinkler drop ruler 100 further includes the handle 108. A perspective view of the handle 108 is illustrated in FIG. 4. The handle 108 can be a variety of lengths, such as 4'-0" for an 8' ceiling and 5'-6" for a 10' ceiling. These lengths are merely for illustration purposes. The handle 108 is connected to rigid frame 102. As shown in FIG. 1, the handle 108 is in fixed relation to the rigid frame 102 so that the opening 104 of the rigid frame 102 is coaxial with the handle 108. In one embodiment, the cross-section of the handle 108 is identical to the opening 104, as shown in FIG. 1. In an alternate embodiment, the cross-section of the handle 108 may be different from the opening 104, such as bigger than the opening 104.

The shape of the handle 108 may be such that the ruler 116 slides adjacent to or within the handle 108. As illustrated in FIG. 4, the handle 108 is illustrated as having a C cross-section, with element 109 indicating the "C" shape; though other shapes may be used which enable the ruler 116 to slide therein. Alternatively, the ruler 116 may slide inside the handle 108. For example, the ruler 116 may slide along a side of the handle 108. Moreover, one end of the ruler 116 may extend beyond an end of the handle 108 even when the top 106 of the ruler is seated in rigid frame 102. For example, ruler 116 can extend 1', 2', 3', or more from the end of the handle, as shown in FIG. 1.

The sprinkler drop ruler 100 may further include extension piece 110. The extension piece 110 may be connected to handle 108, or the extension piece 110 may be integral with handle 108. As discussed in more detail with respect to FIG. 6, the extension piece 110 may be used to calibrate the sprinkler drop ruler 100. Extension piece 110 may further include a window 112. The window 112 may be transparent so that the ruler 116 may be seen therethrough. The window 112 may include one or more indicia 114 to indicate how far the top 106 of the ruler 116 is above the rigid frame 102. For example, when the top 106 of the ruler 116 is flush with the rigid frame 102, the indicia 114 points to "0" of the ruler, indicating that the distance from the top 106 of the ruler 116 to the rigid frame 102 is zero inches. Calibration of the sprinkler drop ruler 100 is discussed below with respect to FIGS. 5-6.

Figure 2:
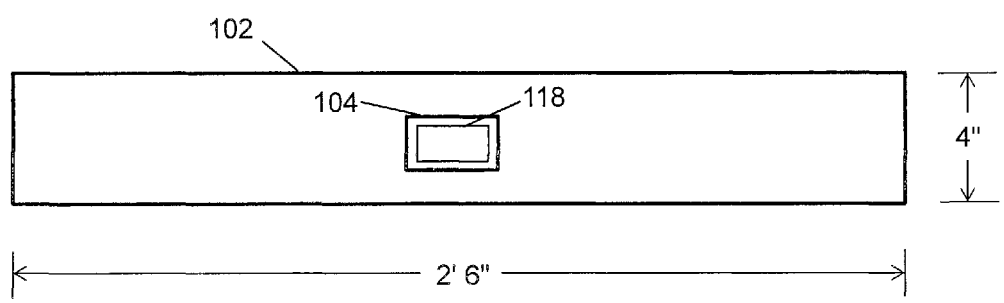
FIG. 2 is a top view of the rigid frame of the sprinkler drop ruler.
Figure 3:
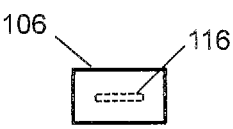
FIG. 3 is a top view of the top of the ruler of the sprinkler drop ruler.

FIG. 2 is a top view of the rigid frame 102 of the sprinkler drop ruler 100. The dimensions of the rigid frame 102 may be 2' 6"×4", as shown in FIG. 2. These dimensions are merely for illustration purposes. Other dimensions are contemplated. As discussed above, the rigid frame 104 includes an opening 104 through which the ruler 116 may slide. The opening 104 may further include a seat or a lip 118 upon which an underside of the top 106 of the ruler 116 may be seated. FIG. 3 is a top view of the top 106 of the ruler 116 of the sprinkler drop ruler 100. The top 106 may be composed of a rubberized or other elastic material and may be shaped such that the top 106 fits into opening 104 and abuts seat 118. Further, the top 106 may be a 2"×2" square or may be rectangular in shape.

FIG. 7 illustrates the sprinkler drop ruler 100 in operation. When the ruler 116 is in the fully retracted position (with the top 106 of the ruler 116 flush against the seat 118), the top 106 of the ruler is flush with the top of the rigid frame. This is considered the "0" position of the ruler for calibration purposes (e.g., the indicia 114 point to "0" on the ruler 116). Further, the sprinklerfitter may hold the handle 108 in one hand up against the ceiling tile lattice. Typically, the ceiling tile lattice is installed, but the ceiling tiles have not yet been installed. In this way, the sprinklerfitter can see the roughed-in pipe outlet. With the other hand, the sprinklerfitter can move the ruler 116 upward until the top 106 of the ruler reaches the roughed-in pipe outlet. When the top 106 of the ruler 116 contacts the roughed-in pipe outlet, the sprinklerfitter can then read the measurement in the window 112, thereby recording the distance of the sprinkler drop. In this way, the measurement is a face-to-face measurement from the ceiling grid to the roughed-in pipe outlet.

Figure 5:
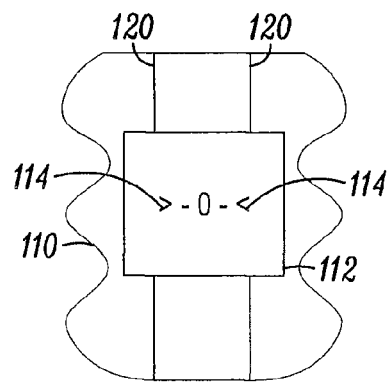
FIG. 5 is a front view of one example of the window, extension piece, and rails.
Figure 6:
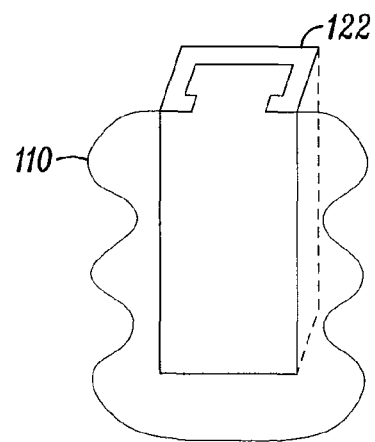
FIG. 6 is a perspective view of another example of the extension piece.

As discussed above, the sprinkler drop ruler may 100 be calibrated. The calibration may be done at manufacture or may be done after purchase. Calibration may comprise "zeroing" out the ruler so that when the top 106 of the ruler 116 is flush with the rigid frame 102, the indicia 114 in the window 112 indicates "0" for the ruler. There are a variety of ways in which to calibrate the sprinkler drop ruler 100. One way is to keep the extension piece 110 stationary and move the window 112 and the indicia 114. The window 112 and the indicia 114 are in fixed relation to one another. The sprinkler drop ruler 100 may be calibrated by moving the window 112 so that the indicia 114 (fixed relative to the window 112) moves as well. When the top 106 is flush with the rigid frame 102, the window 112 is moved until the indicia 114 point to "0" in the ruler. FIG. 5 illustrates one example of adjusting the window 112 in which the window 112 may be moved either up or down based on one or more guides or rails 120. In practice, the window 112 may be moved so that the indicia 114 points to "0" when the top 106 is flush with the rigid frame 102.

Another way is to move the extension piece 110 along with the window 112 and the indicia 114. The extension piece 110, the window 112 and the indicia 114 are in fixed relation to one another. The sprinkler drop ruler 100 may be calibrated by moving the extension piece 110 so that the window 112 and the indicia 114 (which are both fixed relative to the extension piece 110) moves as well. In practice, when the top 106 of the ruler 116 is flush with the rigid frame 102, the extension piece 110 may be moved upward or downward (with the window 112 and the indicia 114 moving along with the extension piece 110) so that the indicia 114 points to "0".

Still another way to calibrate the sprinkler drop ruler 100 is to move the indicia 114. The indicia 114 may be movable upward or downward independent of the window 112. In practice, when the top 106 of the ruler 116 is flush with the rigid frame 102, the indicia 114 may be moved so that the indicia 114 points to "0".

While the invention has been described with reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A sprinkler drop ruler comprising:
a rigid frame having an opening;
a handle connected to the rigid frame and in fixed relation to the rigid frame; and
a ruler with an end shaped to seat in the opening and configured to move inside or along a side of the handle in order to measure a sprinkler drop.

2. The sprinkler drop ruler of claim 1, wherein the ruler is positioned at least partly within the handle and configured to move within the handle.

3. The sprinkler drop ruler of claim 2, wherein the opening of the rigid frame is co-axial with the handle.

4. The sprinkler drop ruler of claim 1, wherein the end of the ruler is rectangular in shape; and
wherein the opening is rectangular in shape and matched to seat the end of the ruler.

5. The sprinkler drop ruler of claim 4, wherein the opening includes a lip configured to engage an underside of the end of the ruler so that when engaged, a top of the end of the ruler is flush with the rigid frame.

6. The sprinkler drop ruler of claim 1, wherein the rigid frame is perpendicular to the handle.

7. The sprinkler drop ruler of claim 1, further comprising a window connected to the handle, the window being transparent and including indicia so that the ruler is visible through the window.

8. The sprinkler drop ruler of claim 7, wherein the ruler is positioned at least partly within the handle and configured to move within the handle; and wherein the sprinkler drop ruler is configured for calibration so that when a top of the end of the ruler is flush with the rigid frame, the indicia point to a zero reading on the ruler.

9. The sprinkler drop ruler of claim 8, wherein the indicia is in fixed relation with the window; and wherein the sprinkler drop ruler is configured for calibration by moving the window.

10. The sprinkler drop ruler of claim 1, wherein at least a part of the ruler is rigid.

11. The sprinkler drop ruler of claim 1, wherein the handle is at least partly C-shaped; and wherein the ruler slides inside the C-shaped handle.

12. The sprinkler drop ruler of claim 1, wherein the rigid frame is rectangular in shape.

13. The sprinkler drop ruler of claim 12, wherein at least one dimension of the rigid frame is greater than or equal to 2'.

14. The sprinkler drop ruler of claim 12, wherein a first dimension of the rigid frame is greater than or equal to 2' and a second dimension of the rigid frame is greater than or equal to 1'.

15. The sprinkler drop ruler of claim 1, wherein when the end of the rule is seated in the opening, an opposite end of the ruler extends beyond an end of the handle.

\* \* \* \* \*

UNITED STATES PATENT AND TRADEMARK OFFICE
CERTIFICATE OF CORRECTION

PATENT NO. : 8,601,700 B2
APPLICATION NO. : 13/325724
DATED : December 10, 2013
INVENTOR(S) : Matthew Scavone Page 1 of 1

It is certified that error appears in the above-identified patent and that said Letters Patent is hereby corrected as shown below:

In the Claims

In column 5, claim 15, line 26, after "end of the" replace "rule" with --ruler--.

Signed and Sealed this
Eighteenth Day of February, 2014

Michelle K. Lee
*Deputy Director of the United States Patent and Trademark Office*